United States Patent
Yamaguchi et al.

(10) Patent No.: US 8,882,618 B2
(45) Date of Patent: Nov. 11, 2014

(54) REAR DERAILLEUR

(71) Applicant: Shimano Inc., Osaka (JP)

(72) Inventors: Sota Yamaguchi, Osaka (JP); Atsuhiro Emura, Osaka (JP); Tsuyoshi Miyake, Osaka (JP); Ryuichiro Takamoto, Osaka (JP); Yoshiyuki Kasai, Osaka (JP); Mao Kuroda, Osaka (JP)

(73) Assignee: Shimano Inc., Osaka (JP)

( * ) Notice: Subject to any disclaimer, the term of this patent is extended or adjusted under 35 U.S.C. 154(b) by 142 days.

(21) Appl. No.: 13/752,622

(22) Filed: Jan. 29, 2013

(65) Prior Publication Data

US 2014/0213397 A1    Jul. 31, 2014

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| B62M 9/122 | (2010.01) |

(52) U.S. Cl.
CPC ..................................... B62M 9/122 (2013.01)
USPC .............................................. 474/82; 474/80

(58) Field of Classification Search
USPC ....................................................... 474/80, 82
See application file for complete search history.

(56) References Cited

U.S. PATENT DOCUMENTS

| | | | |
|---|---|---|---|
| 4,406,643 A * | 9/1983 | Shimano ......................... | 474/82 |
| 6,945,888 B2 * | 9/2005 | Fukuda et al. .................. | 474/70 |
| 6,949,040 B2 * | 9/2005 | Ando ............................... | 474/82 |
| 7,001,294 B2 * | 2/2006 | Fukuda ......................... | 474/102 |
| 7,980,974 B2 * | 7/2011 | Fukuda ......................... | 474/70 |
| 8,025,597 B2 * | 9/2011 | Takamoto ....................... | 474/70 |
| 8,202,182 B2 * | 6/2012 | Ishikawa et al. ................ | 474/82 |
| 8,602,929 B2 * | 12/2013 | Ishikawa et al. ................ | 474/82 |
| 2007/0219029 A1 * | 9/2007 | Turner ............................ | 474/80 |
| 2009/0054183 A1 | 2/2009 | Takaichi et al. | |
| 2009/0291789 A1 * | 11/2009 | Ishikawa et al. ................ | 474/82 |
| 2012/0083371 A1 * | 4/2012 | Yamaguchi et al. ............ | 474/80 |
| 2012/0083372 A1 * | 4/2012 | Yamaguchi et al. ............ | 474/80 |
| 2012/0258827 A1 * | 10/2012 | Ishikawa et al. ................ | 474/80 |

(Continued)

FOREIGN PATENT DOCUMENTS

| | | | |
|---|---|---|---|
| EP | 1415902 A2 | 5/2004 | |
| EP | 2128014 A1 | 12/2009 | |

*Primary Examiner* — Henry Liu
(74) *Attorney, Agent, or Firm* — Global IP Counselors

(57) ABSTRACT

A rear derailleur is basically provided with a base member, a movable member, a chain guide, a friction element, a one-way clutch and an electric actuator. The base member is configured to be mounted to a bicycle. The movable member is movably coupled to the base member. The chain guide is coupled to the movable member to rotate around a rotational axis with respect to the movable member. The friction element is operatively arranged between the movable member and the chain guide to frictionally provide rotational resistance in a first rotational direction of the chain guide. The one-way clutch is operatively disposed between movable member and the chain guide to engage the friction element as the chain guide rotates in the first rotational direction. The electric actuator is operatively coupled to the one-way clutch to control the one-way clutch between a clutch-on mode and a clutch-off mode.

20 Claims, 18 Drawing Sheets

(56) References Cited

U.S. PATENT DOCUMENTS

| | | |
|---|---|---|
| 2013/0090195 A1 | 4/2013 | Yamaguchi et al. |
| 2013/0090196 A1* | 4/2013 | Yamaguchi et al. ............ 474/80 |
| 2013/0203532 A1* | 8/2013 | Jordan ............................ 474/82 |
| 2013/0288834 A1* | 10/2013 | Yamaguchi ..................... 474/80 |
| 2013/0310204 A1* | 11/2013 | Shahana et al. ................. 474/80 |
| 2014/0162817 A1* | 6/2014 | Yamaguchi ..................... 474/80 |
| 2014/0162818 A1* | 6/2014 | Yamaguchi et al. ............ 474/80 |
| 2014/0213397 A1* | 7/2014 | Yamaguchi et al. ............ 474/80 |

* cited by examiner

REAR DERAILLEUR

BACKGROUND

1. Field of the Invention

This invention generally relates to a rear derailleur for a bicycle. More specifically, the present invention relates to a rear derailleur that is provided with a friction element between the movable member and the chain guide.

2. Background Information

A typical bicycle rear derailleur is used to selectively move a chain from one of a plurality of sprockets to another for changing speeds of the bicycle. A rear typical derailleur includes a base member adapted to be mounted to the bicycle frame, a movable member movably coupled to the base member, and a chain guide coupled to the movable member. The chain guide engages the chain to selectively switch the chain among the plurality of sprockets when the movable member moves relative to the base member.

The chain guide of a rear derailleur ordinarily is rotatably mounted to the movable member, and is spring-biased in a clockwise direction so that the chain guide can take up the slack in the chain when the chain engages the smaller-diameter sprockets. However, during rough riding, bumps and shocks may cause the chain guide to rotate counterclockwise, thereby creating undesirable slack in the chain. To prevent this from occurring, motion resisting structures have been added to some rear derailleurs. An example of a motion resisting structure is disclosed in U.S. Patent Application Publication Number 2009/0054183 A1. As shown therein, a bicycle derailleur comprises a base member adapted to be mounted to a bicycle, a movable member movably coupled to the base member, and a chain guide coupled to the movable member. The chain guide is coupled for rotation around a rotational axis, and a biasing element biases the chain guide in a selected rotational direction around the rotational axis. A rotation resistance applying unit applies a resistance to rotational movement of the chain guide in a direction opposite the selected rotational direction, and an adjusting unit adjusts an amount of resistance applied by a friction element of the rotation resistance applying unit.

SUMMARY

Generally, the present disclosure is directed to various features of a bicycle rear derailleur.

In accordance with a first aspect of the present invention, a rear derailleur is proposed that basically comprises a base member, a movable member, a chain guide, a friction element, a one-way clutch and an electric actuator. The base member is configured to be mounted to a bicycle. The movable member is movably coupled to the base member. The chain guide is coupled to the movable member to rotate around a rotational axis with respect to the movable member. The friction element is operatively arranged between the movable member and the chain guide to frictionally provide rotational resistance in a first rotational direction of the chain guide. The one-way clutch is operatively disposed between movable member and the chain guide to engage the friction element as the chain guide rotates in the first rotational direction. The electric actuator is operatively coupled to the one-way clutch to control the one-way clutch between a clutch-on mode and a clutch-off mode.

In accordance with a second aspect of the present invention, the rear derailleur according to the first aspect is configured so that the electric actuator is mounted on the movable member.

In accordance with a third aspect of the present invention, the rear derailleur according to the first aspect is configured so that the electric actuator includes a motor having an output shaft, and a mode switching part being operative coupled to the output shaft of the motor to switch the one-way clutch between the clutch-on mode and the clutch-off mode.

In accordance with a fourth aspect of the present invention, the rear derailleur according to the third aspect is configured so that the electric actuator further includes a gear reduction unit connecting the output shaft of the motor to the mode switching part.

In accordance with a fifth aspect of the present invention, the rear derailleur according to the first aspect is configured so that the electric actuator includes a mode switching part and a solenoid, which is operatively coupled to the mode switching part to switch the one-way clutch between the clutch-on mode and the clutch-off mode.

In accordance with a sixth aspect of the present invention, the rear derailleur according to the fifth aspect is configured so that the electric actuator includes a holder connected to the solenoid to move in a direction parallel to the rotational axis, and so that the mode switching part includes a control ring to rotate the control ring about the rotational axis as the solenoid moves the holder in the direction parallel to the rotational axis.

In accordance with a seventh aspect of the present invention, the rear derailleur according to the sixth aspect is configured so that the electric actuator further includes a cam structure formed on at least one of the control ring and the holder.

In accordance with an eighth aspect of the present invention, the rear derailleur according to the first aspect is configured so that the first rotational direction is a counterclockwise rotational direction of the chain guide around the rotational axis while being viewed along the rotational axis from a non-frame facing side of the movable member.

In accordance with a ninth aspect of the present invention, the rear derailleur according to the first aspect further comprises a biasing element biasing the movable member toward a low gear position with respect to the base member.

In accordance with a tenth aspect of the present invention, the rear derailleur according to the first aspect further comprises a shift motor operatively coupled to the movable member to move the movable member in a lateral direction with respect to the base member.

In accordance with an eleventh aspect of the present invention, the rear derailleur according to the first aspect further comprises a controller connected to the electric actuator to control the electric actuator between a clutch-on position, which controls the one-way clutch to the clutch-on mode, and a clutch-off position, which controls the one-way clutch to the clutch-off mode.

In accordance with a twelfth aspect of the present invention, the rear derailleur according to the eleventh aspect is configured so that the controller controls the electric actuator from the clutch-on position to the clutch-off position as the chain guide moves in a lateral direction with respect to the base member from a first gear position to a second gear position.

In accordance with a thirteenth aspect of the present invention, the rear derailleur according to the eleventh aspect is configured so that the controller controls the electric actuator to the clutch-on position while the chain guide is not being shifted.

In accordance with a fourteenth aspect of the present invention, the rear derailleur according to the eleventh aspect is configured so that the controller repeatedly attempts to control the electric actuator to the clutch-off position upon a predetermined time having elapsed without receiving a signal indicative of a next gear position being attained after a shift operation command has been issued.

In accordance with a fifteenth aspect of the present invention, the rear derailleur according to the eleventh aspect is configured so that the controller repeatedly attempts to control the electric actuator to the clutch-on upon detecting current of the electric actuator being above a predetermined current level during a shifting operation.

In accordance with a sixteenth aspect of the present invention, the rear derailleur according to the eleventh aspect further comprises an actuator position sensor arranged to detect an operation position of the electric actuator. The controller adjusts a voltage output to a shift motor that operatively coupled to the movable member to move the movable member in a lateral direction with respect to the base member upon the actuator position sensor indicating the operation position of the electric actuator is in the clutch-on position, during a shifting operation.

In accordance with a seventeenth aspect of the present invention, the rear derailleur according to the eleventh aspect further comprises an aduator position sensor arranged to detect an operation position of the electric actuator. The controller operated the electric actuator from the clutch-on position to the clutch-off position upon the actuator position sensor indicating the operation position of the electric actuator is in the clutch-on position after a shift operation command has been issued.

In accordance with an eighteenth aspect of the present invention, the rear derailleur according to the seventeenth aspect is configured so that the controller repeatedly attempts to control the electric actuator from the clutch-on position to the clutch-off position while the actuator position sensor indicates the operation position of the electric actuator is in the clutch-on position.

In accordance with a nineteenth aspect of the present invention, the rear derailleur according to the eighteenth aspect is configured so that the controller outputs a notification that the electric actuator is malfunctioning upon reaching a predetermined number of attempts.

In accordance with a twentieth aspect of the present invention, the rear derailleur according to the eleventh aspect is configured so that the controller controls the electric actuator from the clutch-on position to the clutch-off position upon determining a bicycle speed is below a predetermined speed.

Other objects, features, aspects and advantages of the disclosed rear derailleur will become apparent to those skilled in the art from the following detailed description, which, taken in conjunction with the annexed drawings, discloses preferred embodiments of the rear derailleur.

BRIEF DESCRIPTION OF THE. DRAWINGS

Referring now to the attached drawings which form a part of this original disclosure:

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
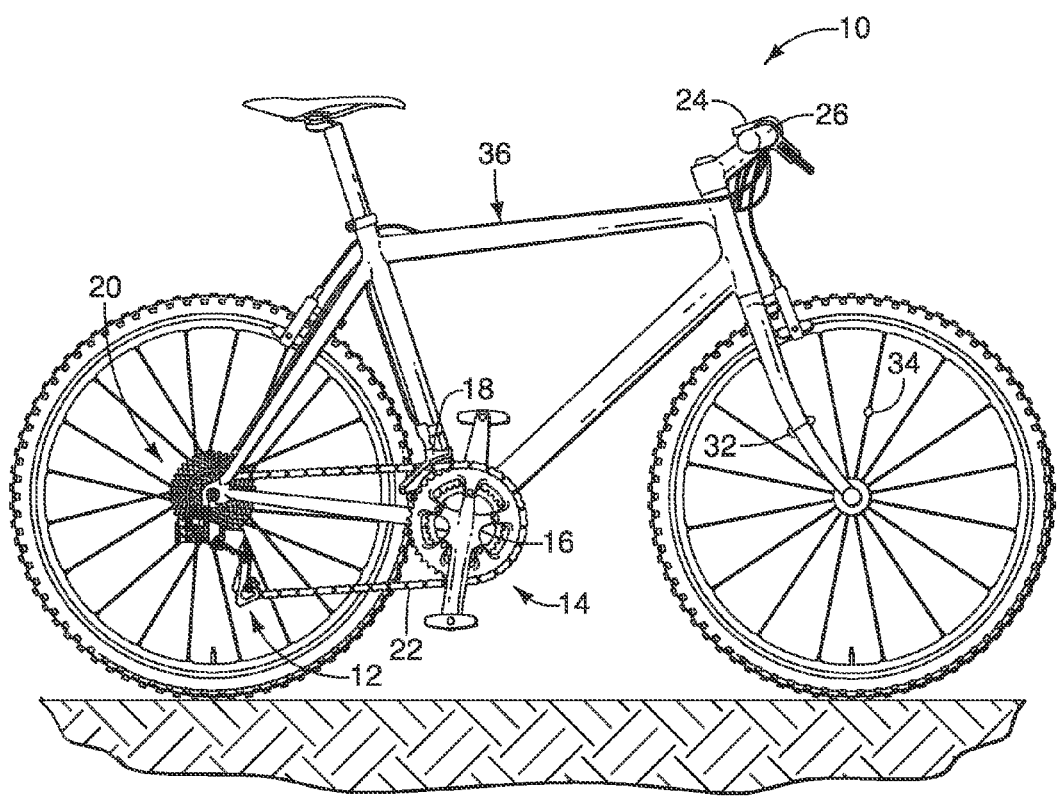
FIG. 1 is a side elevational view of a bicycle that includes a plurality of rear sprockets and a bicycle rear derailleur in accordance with one illustrative embodiment.

Referring initially to FIG. 1, a bicycle 10 is illustrated that includes a rear derailleur 12 in accordance with one illustrative embodiment. In the illustrated embodiment, the rear derailleur 12 is an electrically-controlled derailleur that is a part of a bicycle drive train 14. The drive train 14 basically includes a front crankset 16, an electrically-controlled front derailleur 18, a set of rear sprockets 20 and a chain 22.

Figure 2:
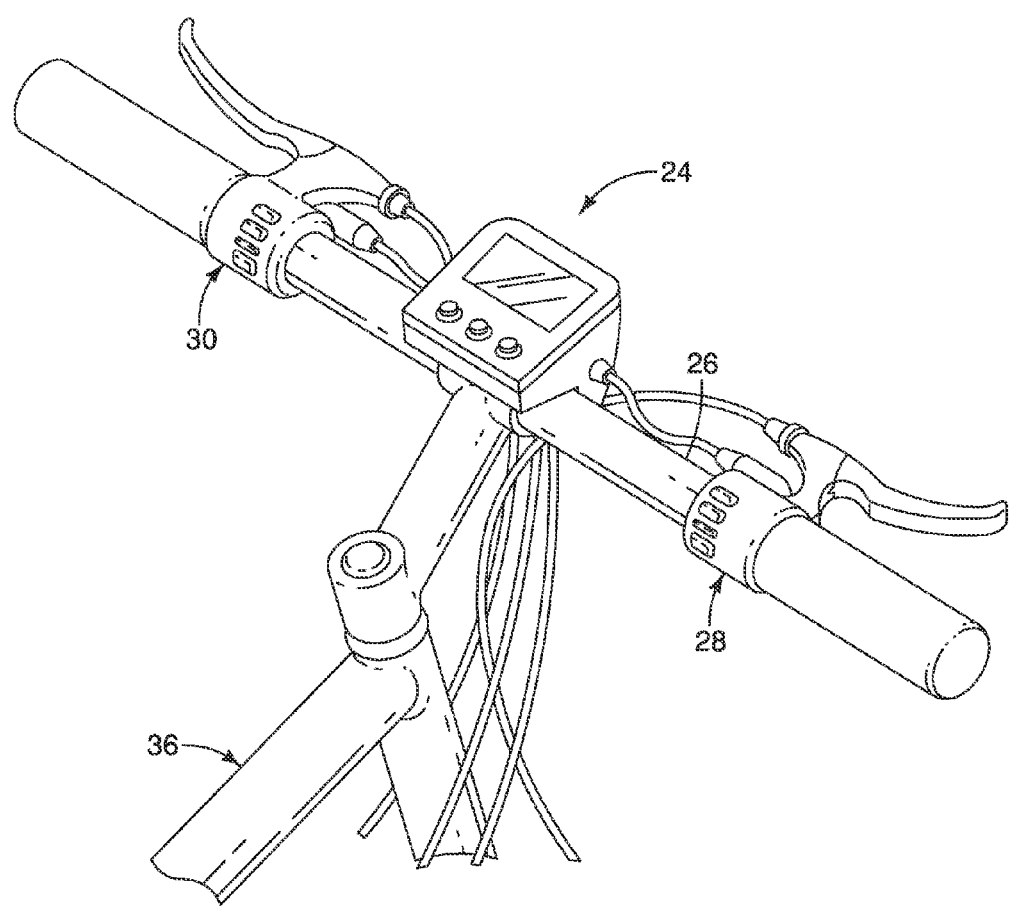
FIG. 2 is a perspective view of a handlebar area of the bicycle illustrated in FIG. 1, with a controller and switches mounted to a straight type handlebar.

As seen in FIG. 2, a bicycle control unit 24 is mounted to a handlebar 26 of the bicycle 10. The bicycle control unit 24 is electrically connected to the rear derailleur 12 and the front derailleur 18 for outputting commands or control signals to operate the rear derailleur 12 and the front derailleur 18. An electric shifter 28 is mounted to the handlebar 26 for operating the rear derailleur 12 either directly or through the bicycle control unit 24. An electric shifter 30 is mounted to the handlebar 26 for operating the front derailleur 18 either directly or through the bicycle control unit 24. While the electric shifters 28 and 30 are electrically connected to the bicycle control unit 24 for outputting commands or control signals to the bicycle control unit 24, the electric shifters 28 and 30 could be configured to wirelessly communicate with the bicycle control unit 24 and/or the rear derailleur 12 and the front derailleur 18, respectively.

The bicycle control unit 24 interprets and executes instructions (data, signals and commands) of the various programs and hardware to direct the operation of the rear derailleur 12 and the front derailleur 18 as well as other components as needed and/or desired. The bicycle control unit 24 includes a microcomputer that includes a processor and memory for processing the various signals from the various sensors and components of the bicycle 10. While the bicycle control unit 24 is illustrated as a single separate unit, the bicycle control unit 24 could be part of another component or could be a part of several components (e.g., multiple controllers located in different parts).

In the illustrated embodiment, the bicycle 10 further includes a speed sensor 32 mounted to a portion (e.g., a front fork) of the bicycle 10. The speed sensor 32 detects a magnet 34 mounted to one of the spokes of the front wheel of the bicycle 10. The speed sensor 32 can be, for example, either a Hall Effect sensor or a reed (magnetic) switch that senses the magnet 34 as the front wheel of the bicycle 10 and the magnet 34 pass in the vicinity of the speed sensor 32. The signal of the speed sensor 32 is outputted to the bicycle control unit 24 either wirelessly or by a wire (not shown).

In the illustrated embodiment, the bicycle control unit 24 is preferably provided with both a manual shifting mode and an automatic shifting mode. While the rear derailleur 12 and the front derailleur 18 are illustrated as being used with the bicycle control unit 24, it will be apparent to those skilled in the art from this disclosure that the bicycle control unit 24 could be removed so that the rear derailleur 12 and the front derailleur 18 are directly controlled by the electric shifters 28 and 30, respectively.

Referring now to FIGS. 3 to 6, the rear derailleur 12 will now be discussed in more detail. The rear derailleur 12 is secured to a rear portion of a bicycle frame 36 by a fixing bolt 38 in a conventional manner. The rear derailleur 12 is operated by the electric shifter 28, which is a shift actuating device. The electric shifter 28 operates the rear derailleur 12 between a plurality of shift stage (gear) positions such that the chain 22 is moved by the rear derailleur 12 in a lateral direction between the rear sprockets 20. The rear derailleur 12 is illustrated in a low shift stage (gear) position in FIG. 3. As used herein, the term "low shift stage (gear) position" refers to the rear derailleur 12 being in an operating position that corresponds to the chain 22 being guided onto the one of the rear sprockets 20 with the largest number of teeth. As used herein, the term "top shift stage (gear) position" refers to the rear derailleur 12 being in an operating position that corresponds to the chain 16 being guided onto the one of the rear sprockets 20 with the smallest number of teeth.

Figure 3:
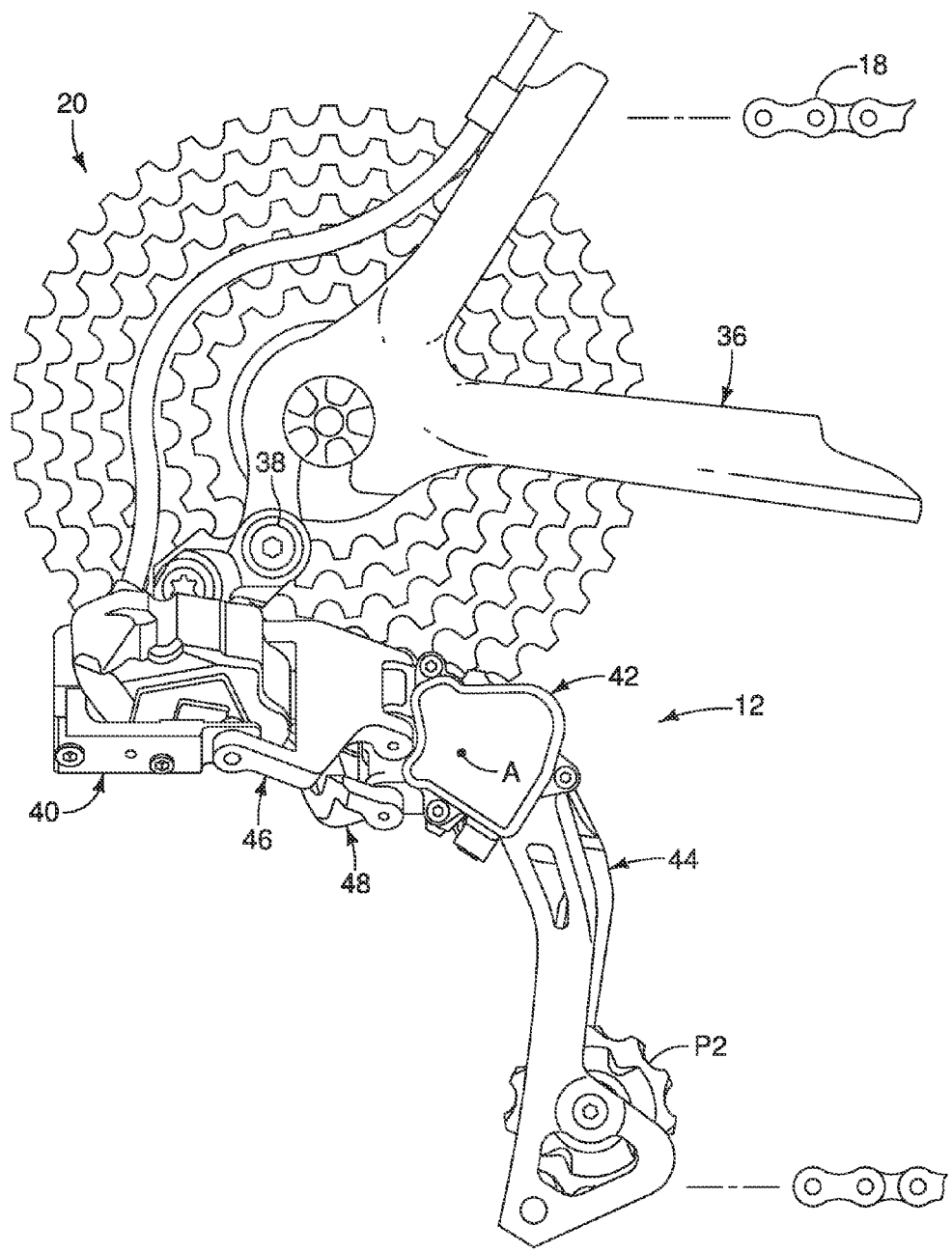
FIG. 3 is an enlarged, partial side elevational view of a portion of the rear derailleur illustrated in FIG. 1.
Figure 4:
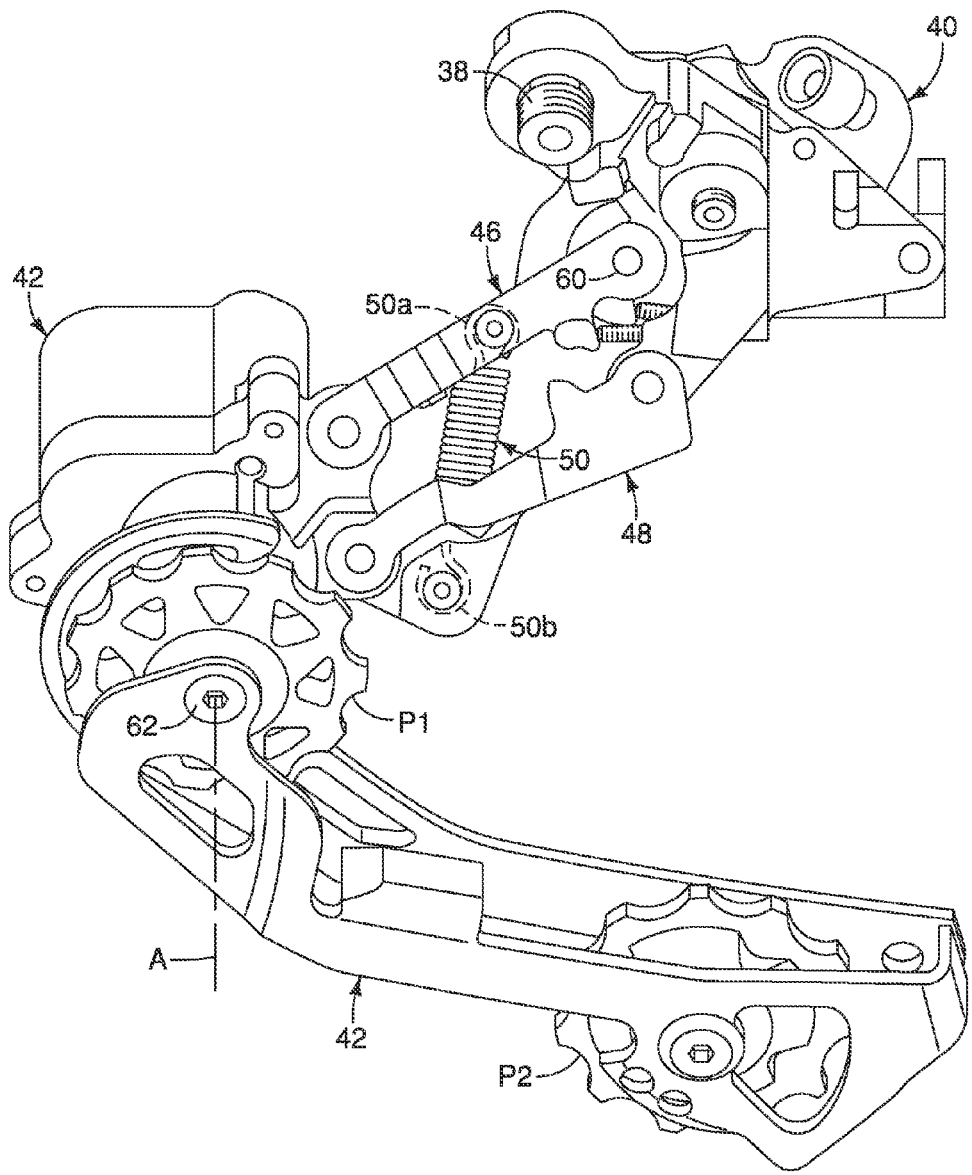
FIG. 4 is a frame facing side perspective view of the rear derailleur illustrated in FIG. 3 with the rear derailleur in the low operating position when a chain is not engaged.

As seen in FIGS. 3 and 4, the rear derailleur 12 basically comprises a base member 40, a movable member 42 and a chain guide 44. The base member 40 is configured to be mounted to the bicycle 10 by the fixing bolt 38. The movable member 42 is movably coupled to the base member 40. The chain guide 44 is relatively conventional, and includes a pair of pulleys P1 and P2. The chain guide 44 is coupled to the movable member 42 to rotate around a rotational axis A with respect to the movable member 42. Thus, the chain guide 44 rotates around the rotational axis A with respect to the movable member 42 when the movable member 42 is moved between the various gear positions. In the illustrated embodiment, the rear derailleur 12 further comprises a first or outer link 46 and a second or inner link 48 for movably connecting the movable member 42 to the base member 40. The outer and inner links 46 and 48 have first ends pivotally connected to the base member 40 and second ends pivotally connected to the movable member 42 to define a four bar linkage arrangement.

As best seen in FIG. 4, the rear derailleur 12 further comprises a first biasing element 50 that biases the movable member 42 toward a low gear position with respect to the base member 40. In the illustrated embodiment, the first biasing member 50 is a coil tension spring that has a first end 50a connected to the outer link 46 and a second end 50b connected to the inner link 48.

Figure 5:
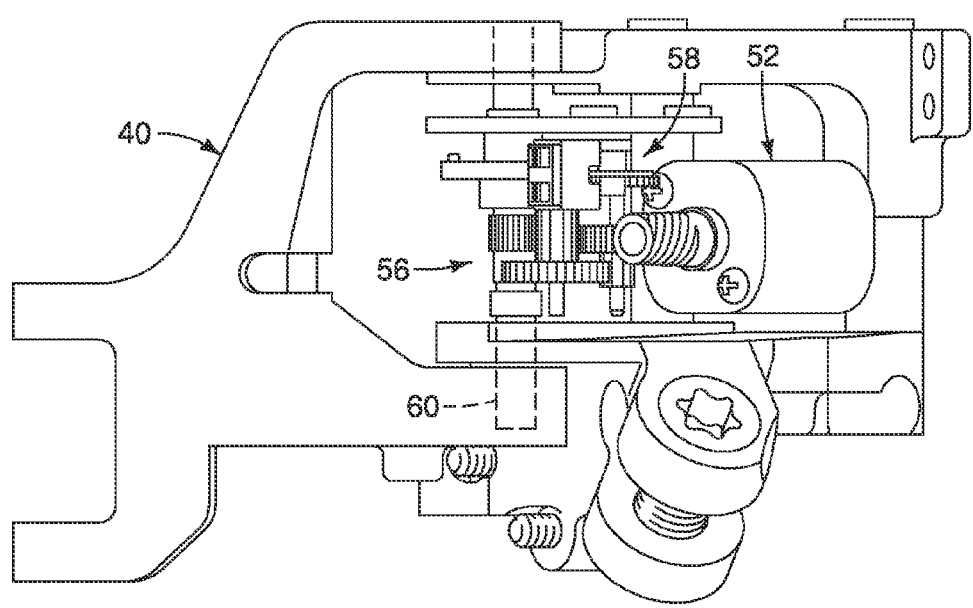
FIG. 5 is a top view of the outer link and the internal components of the motor unit of the rear derailleur of FIGS. 3 and 4.

As seen in FIG. 5, the rear derailleur 12 further comprises a shift motor 52 that is operatively coupled to the movable member 42 via the outer link 46 to move the movable member 42 in a lateral direction with respect to the base member 40. The shift motor 52 is a reversible electric motor. The rear derailleur 12 further comprises a controller 54 that controls the operation of the shift motor 52. The shift motor 52 is part of a motor unit that is mounted on the base member 40. In the illustrated embodiment, the motor unit further includes a gear reduction unit 56 and a shift stage position sensor 58.

The shift motor 52 is connected to the connected the outer link 46 by the gear reduction unit 56. Specifically, the outer link 46 is fixed to one end of an output shaft 60 of the gear reduction unit 56. Rotation of the output shaft 60 in a first or forward rotational direction moves the movable member 42 and the chain guide 44 toward a top shift stage position with respect to the base member 40. Rotation of the output shaft 60 in a second or reverse rotational direction moves the movable member 42 and the chain guide 44 toward a low shift stage position with respect to the base member 40. Alternatively, the inner link 46 may be fixed to one end of an output shaft 60 of the gear reduction unit 56.

As seen in FIG. 5, the shift stage position sensor 58 of the illustrated embodiment is formed by a position sensor shutter wheel and a dual channel photo interrupter. The dual channel photo interrupter of the shift stage position sensor 58 is electrical connected to the controller 54. The shift stage position sensor 58 generates a gear position signal based on a rotational amount of the position sensor shutter wheel. In particular, the position sensor shutter wheel is rotated by rotation of the gear reduction unit 56, which is rotated by the shift motor 52. Thus, the rotation of the position sensor shutter wheel is indicative of the amount of movement of the chain guide 44 from operation of the shift motor 52. The dual channel photo interrupter has a light source (e.g., an LED) and a light detector (e.g., a phototransistor). The light source (e.g., an LED) is disposed on one side of the shutter wheel. The light detector (e.g., a phototransistor) that is disposed on the other side of the shutter wheel. The light from the light source passes through circumferentially spaced apart openings in the shutter wheel as the shutter wheel is rotated. The light passes through the openings in the shutter wheel is then detected as pulses of light by the light detector for determining the rotational operation amount of the output shaft 60 by the gear reduction unit 56. Thus, the shift stage position sensor 58 generates and outputs a gear position signal to the controller 54. The shift stage position sensor 58 is not limited to the illustrated embodiment. Rather, other types of shift stage position sensors can be used such as potentiometers, resistive position sensors, optical position sensors, contact switches, Hall Effect sensor, MR sensor, etc.

Figure 6:
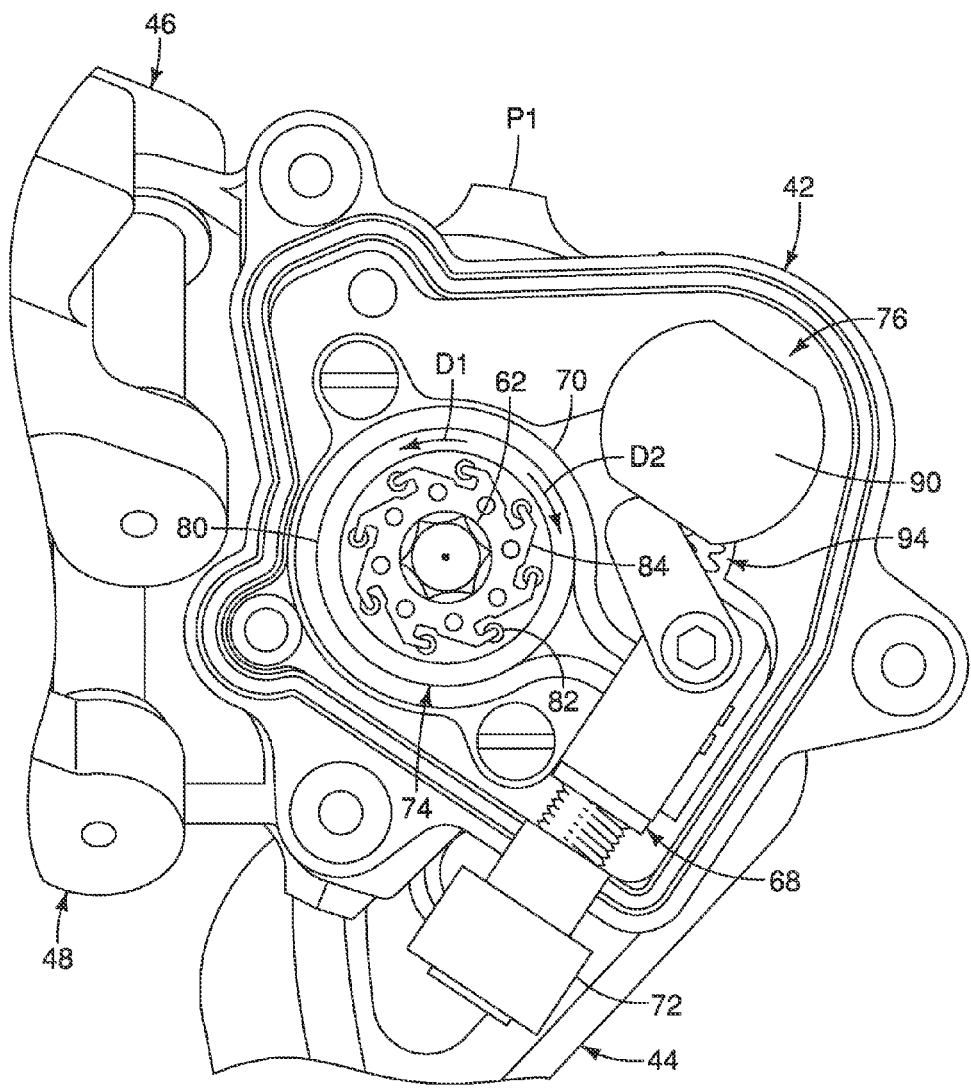
FIG. 6 is a partial side elevational view of a rear portion of the rear derailleur illustrated in FIGS. 3 and 4 with a cover member of the movable member is detached.
Figure 7:
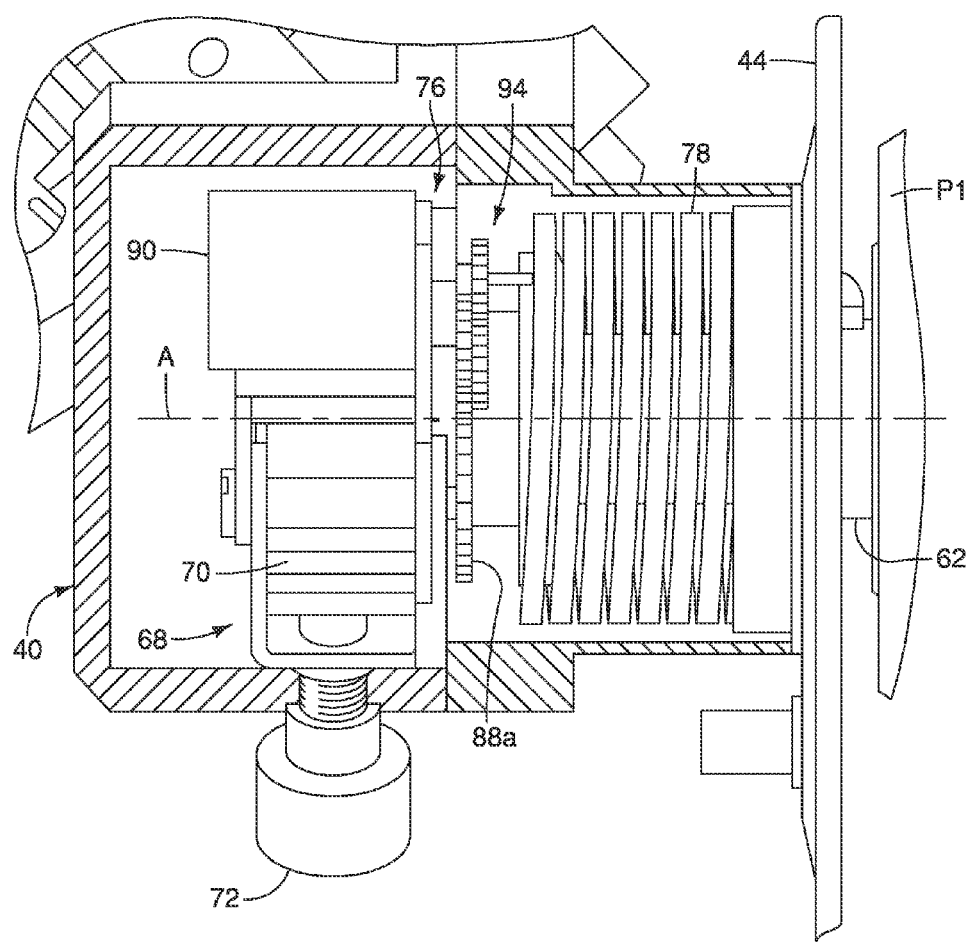
FIG. 7 is a partially cross sectional view of the movable member of the rear derailleur illustrated in FIGS. 3 and 4.

As seen in FIGS. 6 and 7, the chain guide 44 is fixedly attached to a rotational axle 62, which is rotatably mounted to the movable member 42. In other words, the chain guide 44 is coupled to the movable member 42 by the rotational axle 62 for rotation around the rotational axis A. For assembly purposes, the rotational axle 62 is preferably constructed of several sections that are removably connected together. Also preferably, although not shown, bushings and/or bearings are provided between the movable member 42 and the rotational axle 62.

In the illustrated embodiment, the rear derailleur 12 further comprises a rotation resistance applying unit 68 having a friction element 70 that applies a resistance to rotational movement of the chain guide 44 in a second rotational direction opposite the first rotational direction. Here, the friction element 70 is a band type friction element. Preferably, the rotation resistance (friction) of the rotation resistance applying unit 68 is adjustable. Thus, in the illustrated embodiment, an adjustment bolt 72 is provided for squeezing the free ends of the friction element 70 together to obtain the desired frictional resistance.

In the illustrated embodiment, the friction element 70 is operatively arranged between the movable member 42 and the chain guide 44 to frictionally provide rotational resistance in a first rotational direction D1 of the chain guide 44 as the chain guide 44 rotates about the rotational axis A. The first rotational direction D1 is a counterclockwise rotational direction of the chain guide 44 around the rotational axis A while being viewed along the rotational axis A from a non-frame facing side of the movable member 42. More specifically, the rear derailleur 12 further comprises a one-way clutch 74 that is operatively disposed between movable member 42 and the chain guide 44 to engage the friction element 70 as the chain guide 44 rotates in the first rotational direction D1. In the illustrated embodiment, the rear derailleur 12 further comprises an electric actuator 76 that is operatively coupled to the one-way clutch 74 to control the one-way clutch 74 between a clutch-on mode and a clutch-off mode.

As seen in FIG. 7, a second biasing element 78 biases the chain guide 44 around the rotational axis A in a second rotational direction D2 around the rotational axis A, which is opposite to the first rotational direction D1. Thus, the second rotational direction D2 is a clockwise rotational direction of the chain guide 44 around the rotational axis A while being viewed along the rotational axis A from the non-frame facing side of the movable member 42. In this illustrated embodiment, the second biasing element 78 is a torsion spring having a first end disposed in an opening in the movable member 42 and a second end disposed in an opening in the chain guide 44.

In the illustrated embodiment, as seen in FIG. 6, the one-way clutch 74 is disposed between the friction element 70 and the rotational axle 62. The friction element 70 applies resistance to the rotational movement of the chain guide 44 in the first rotational direction D1 with respect to the movable member 42. In particular, the friction element 70 applies frictional resistance to rotational movement of the chain guide 44 by applying frictional resistance to the rotation of the one-way clutch 74. A protective cover is mounted to the movable member 42 to protect and enclosed the one-way clutch 74 and the friction element 70 from the outside environment.

Figure 8:
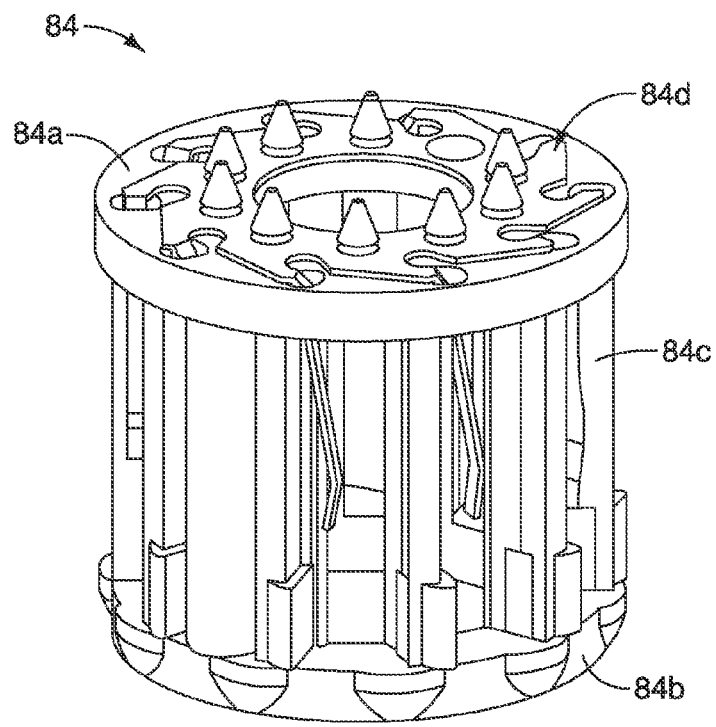
FIG. 8 is a perspective view of a roller retainer for the roller clutch of the rear derailleur illustrated in FIGS. 3 and 4.
Figure 9:
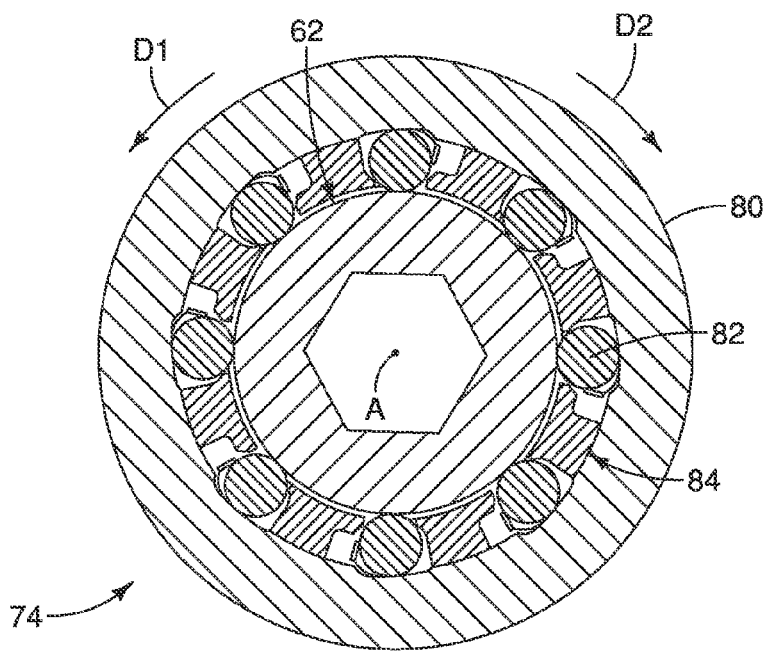
FIG. 9 is a transverse cross sectional view of the roller clutch of the rear derailleur illustrated in FIGS. 3 and 4.

Referring to FIGS. 6, 8 and 9, the rotational axle 62 forms an inner race of the one-way clutch 74 in this embodiment. The one-way clutch 74 further includes an outer race 80, a plurality of rollers 82 and a roller retainer 84. The friction element 74 applies friction to an outer peripheral surface of the outer race 80 of the one-way clutch 74 as the chain guide 44 and the rotational axle 62 rotate in the first rotational direction D1 with respect to the movable member 42. Thus, in this embodiment, one-way clutch 74 is a roller clutch, which is engaged as the chain guide 44 and the rotational axle 62 rotate in the first rotational direction D1 with respect to the movable member 42, and which is disengaged as the chain guide 44 and the rotational axle 62 rotate in the second rotational direction D2 with respect to the movable member 42. Thus, the chain guide 44 and the rotational axle 62 can freely rotate relative to the movable member 42 without receiving the rotational resistance of the friction element 74 as the chain guide 44 and the rotational axle 62 rotate in the second rotational direction D2 with respect to the movable member 42.

The roller retainer 84 basically includes a first retainer ring 84a, a second retainer ring 84b, a plurality of retainer columns 84c and a spring assembly 84d as seen in FIG. 8. Since the one-way clutch 74 is discussed in detail in U.S. Patent Application Publication No. 2012/0083371, the one-way clutch 74 will not be discussed in further detail herein.

Referring to FIGS. 6, 7 and 10 to 16, the electric actuator 76 is fixedly mounted on the movable member 42, and the one-way clutch 74 is further provided with a mode switching part 88. Basically, the controller 54 is connected to the electric actuator 76 to control the electric actuator 76, which operates the mode switching part 88 between a clutch-on position, which controls the one-way clutch 74 to the clutch-on mode, and a clutch-off position, which controls the one-way clutch 74 to the clutch-off mode. The mode switching part 88 switches the one-way clutch 74 between a clutch-on mode and a clutch-off mode. In the clutch-on mode, the one-way clutch 74 is operable such that the friction element 70 applies resistance to the rotational axle 62 as the chain guide 44 rotates in the first rotational direction D1 with respect to the movable member 42, but not in the second rotational direction D2. In the clutch-off mode, the one-way clutch 74 is inoperable such that the friction element 70 does not apply resistance to the rotational axle 62 as the chain guide 44 rotates in either the first rotational direction D1 or the second rotational direction D2 with respect to the movable member 42.

In the embodiment of FIGS. 6, 7 and 10 to 16, the electric actuator 76 includes a motor 90 having an output shaft 92 that is operatively coupled to the mode switching part 88 to switch the one-way clutch 74 between the clutch-on mode and the clutch-off mode. The electric actuator 76 further includes a gear reduction unit 94 that connects the output shaft 92 of the motor 90 to the mode switching part 88. In the illustrated embodiment, the electric actuator 76 is electrically connected to the controller 54. The controller 54 outputs signals as discussed below to control the operation of the electric actuator 76 to selectively switch the one-way clutch 74 between the clutch-on mode and the clutch-off mode.

Figure 10:
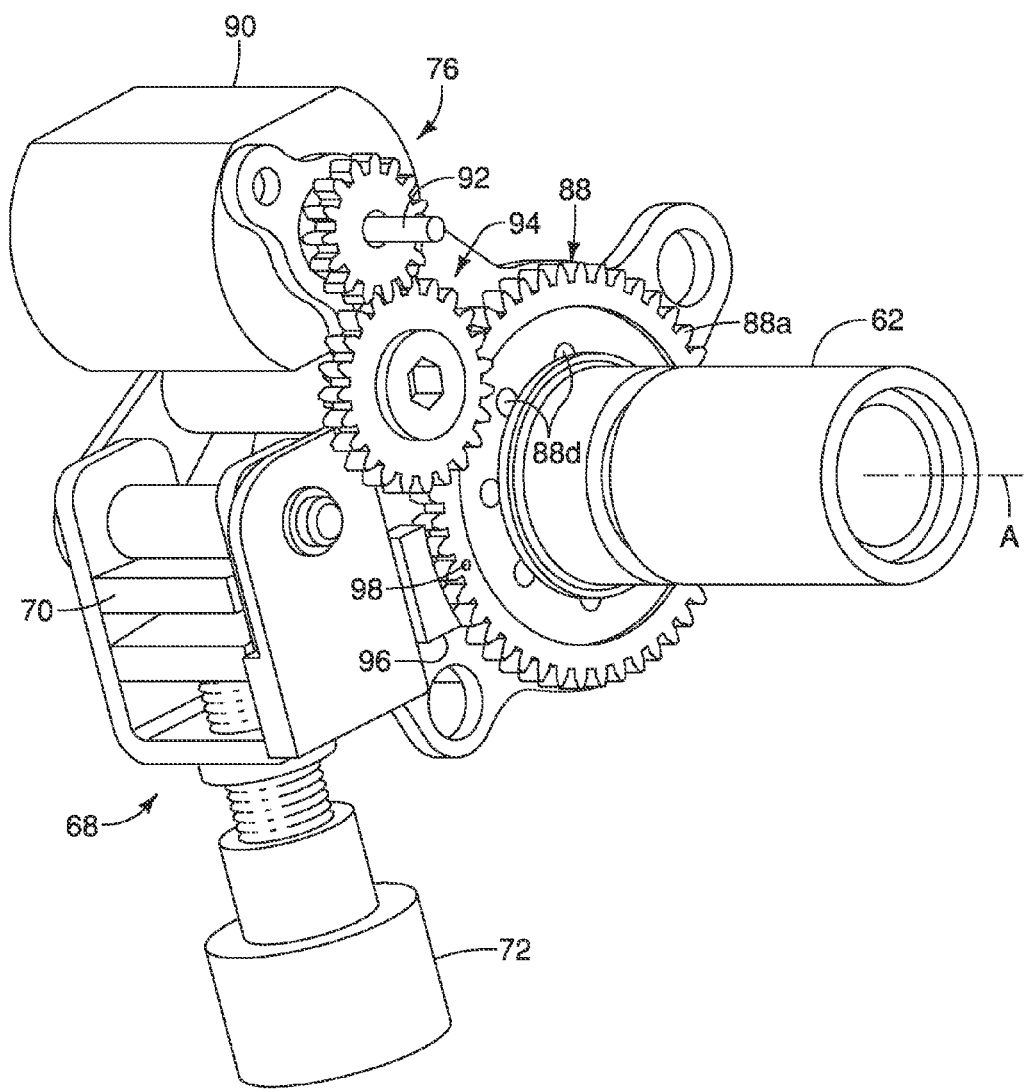
FIG. 10 is a frame facing side perspective view of the friction element, the one-way clutch and the electric actuator of the rear derailleur illustrated in FIGS. 3 and 4.
Figure 11:
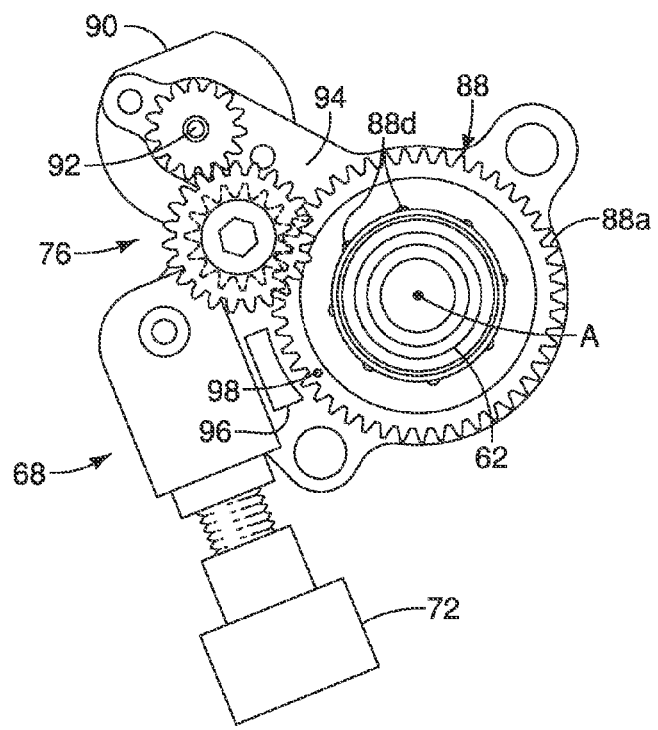
FIG. 11 is a frame facing side elevational view of the friction element, the one-way clutch and the electric actuator illustrated in FIG. 10 with the one-way clutch in a clutch-on mode.
Figure 12:
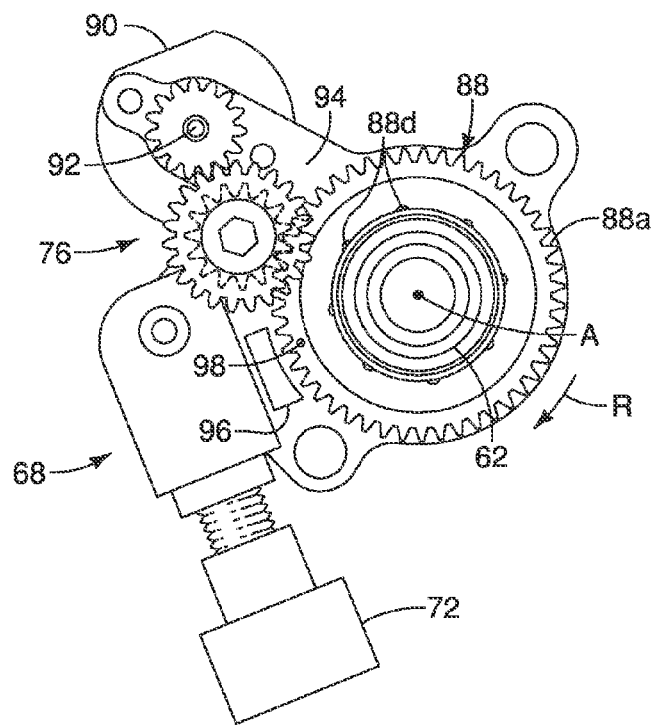
FIG. 12 is a frame facing side elevational view of the friction element, the one-way clutch and the electric actuator illustrated in FIGS. 10 and 11 with the one-way clutch in a clutch-off mode.
Figure 13:
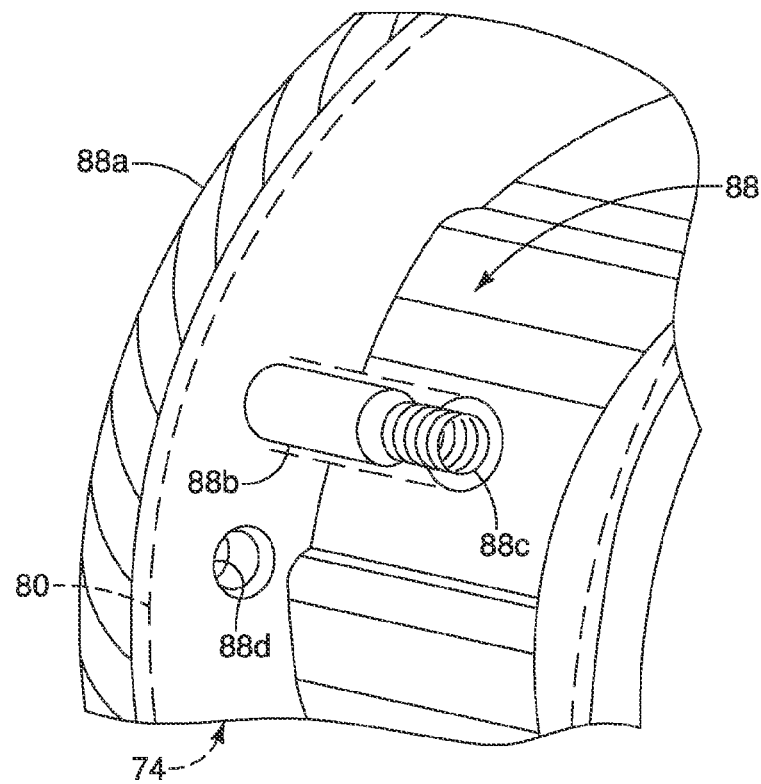
FIG. 13 is a partial enlarged perspective view of a portion of the retainer of the one-way clutch and a portion of the mode switching part in which the one-way clutch is in the clutch-on mode.
Figure 14:
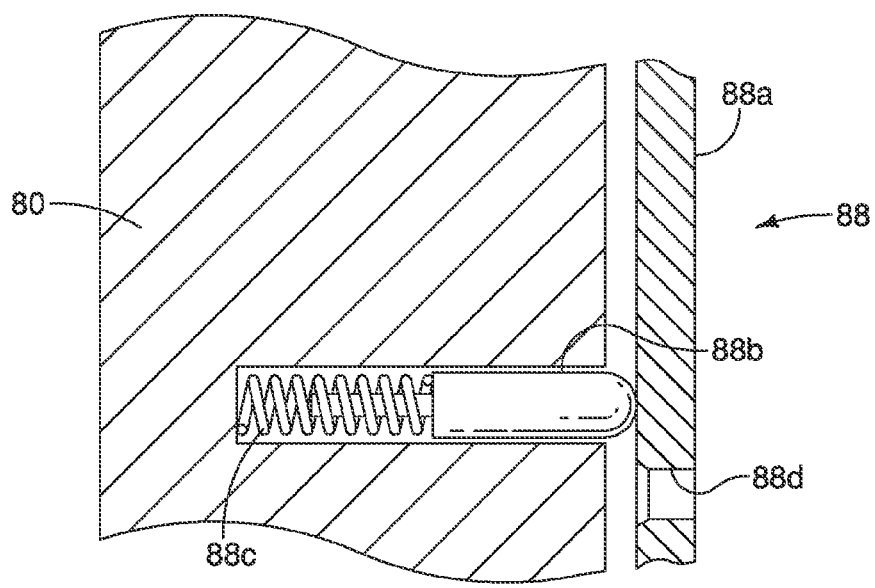
FIG. 14 is a partial enlarged cross sectional view of a portion of the retainer of the one-way clutch and a portion of the mode switching part in which the one-way clutch is in the clutch-on mode.

As seen in FIGS. 10 to 12, the mode switching part 88 includes a gear 88a that is engaged with one of the gears of the gear reduction unit 94 such that rotation of the output shaft 92 of the motor 90 is transmitted to the gear 88a of the mode switching part 88. The gear 88a is rotatably mounted on the rotational axle 62. 62. The mode switching part 88 further includes a plurality of connecting pins 88b (only one shown in FIGS. 13 to 16) and a plurality of biasing elements 88c (only one shown in FIGS. 13 to 16). The connecting pins 88b and the biasing elements 88c are disposed in recesses in the frame facing side of the outer race 80. The biasing elements 88c bias the connecting pins 88b into contact with the non-frame facing side of the gear 88b. The gear 88a and the second retainer ring 84b are fixed each other so that the retainer 84b also rotates when the gear 88a is rotated. The gear 88a changes the relative angle position between the retainer 84b and the outer race 80. The gear 88a includes a plurality of holes 88d for selectively receiving the connecting pins 88b. As seen in FIGS. 13 and 14, when the connecting pins 88b are not engaged with the holes 88d of the gear 88a, the mode switching part 88 places the one-way clutch 74 in the clutch-on mode. In particular, when the connecting pins 88b are not engaged with the holes 88d of the gear 88a, the second retainer ring 84b of the roller retainer 84 of the one-way clutch 74 can rotate to effectively couple the outer race 80 of the one-way clutch 74 to the rotational axle 62 as the rotational axle 62 rotates in the first rotational direction D1 with respect to the movable member 42. Thus, the friction element 70 applies rotational resistance to the rotational axle 62 as the rotational axle 62 rotates in the first rotational direction D1 with respect to the movable member 42, while the connecting pins 88b are not engaged with the holes 88d of the gear 88a.

Figure 15:
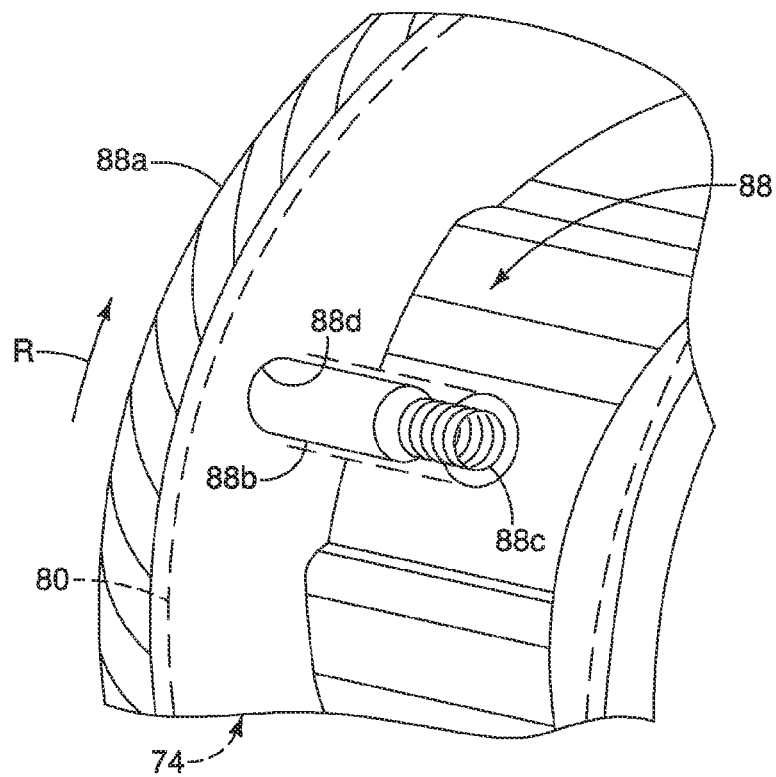
FIG. 15 is a partial enlarged perspective view of a portion of the retainer of the one-way clutch and a portion of the mode switching part in which the one-way clutch is in the clutch-off mode.
Figure 16:
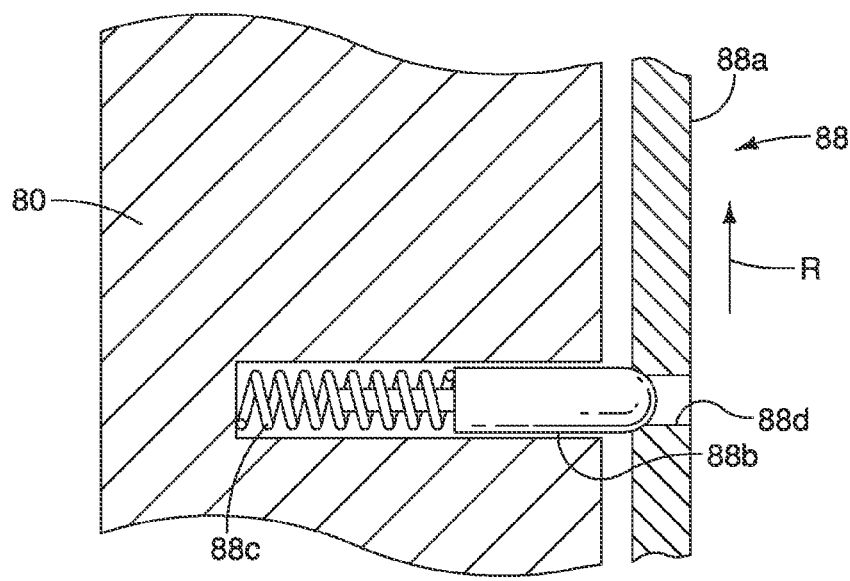
FIG. 16 is a partial enlarged cross sectional view of a portion of the retainer of the one-way clutch and a portion of the mode switching part in which the one-way clutch is in the clutch-off mode.

On the other hand, as seen in FIGS. 15 and 16, when the connecting pins 88b are engaged with the holes 88d of the gear 88a, the mode switching part 88 places the one-way clutch 74 in the clutch-off mode. In particular, when the connecting pins 88b are engaged with the holes 88d of the gear 88a, the second retainer ring 84b of the roller retainer 84 of the one-way clutch 74 cannot rotate to effectively couple the outer race 80 of the one-way clutch 74 to the rotational axle 62. As a result, the rollers 82 cannot move to a position to effectively couple the outer race 80 of the one-way clutch 74 to the rotational axle 62 as the rotational axle 62 rotates in the first rotational direction D1 with respect to the movable member 42. Thus, the friction element 70 does not apply rotational resistance to the rotational axle 62 as the rotational axle 62 rotates in the first rotational direction D1 with respect to the movable member 42, while the connecting pins 88b are engaged with the holes 88d of the gear 88a.

Preferably, the rear derailleur 12 further comprises an actuator position sensor 96 arranged to detect an operation position of the electric actuator 76. The actuator position sensor 96 is electrically connected to the controller 54 and indicates whether the one-way clutch 74 is in either the clutch-on mode or the clutch-off mode. Thus, the controller 54 receives signals from the actuator position sensor 96 such that the controller 54 can determine whether the one-way clutch 74 is in either the clutch-on mode or the clutch-off mode. Preferably, as explained below, the controller 54 operates the electric actuator 76 from the clutch-on position to the clutch-off position upon the actuator position sensor 96 indicating the operation position of the electric actuator 76 is in the clutch-on position after a shift operation command has been issued.

Here, the actuator position sensor 96 is illustrated as detecting the rotational movement of the gear 88a. However, the actuator position sensor 96 is not limited to this arrangement of the illustrated embodiment. Rather, actuator position sensor 96 can detect the rotational movement of one of the gears of the gear reduction unit 94 of some other moving part of the electric actuator 76 which indicates the one-way clutch 74 is in either the clutch-on mode or the clutch-off mode.

For example, as illustrated, the actuator position sensor 96 includes a magnetic signal receiver that includes one or more detecting elements that detects a magnet 98 on the gear 88a. However, the actuator position sensor 96 is not limited to the magnetic type of sensing as in the illustrated embodiment. Rather, other types of position sensors can be used such as potentiometers, resistive position sensors, optical position sensors, contact switches, etc. Thus, the actuator position sensor 96 can be a contact type of sensor or non-contact type of sensor as needed and or desired.

Figure 17:
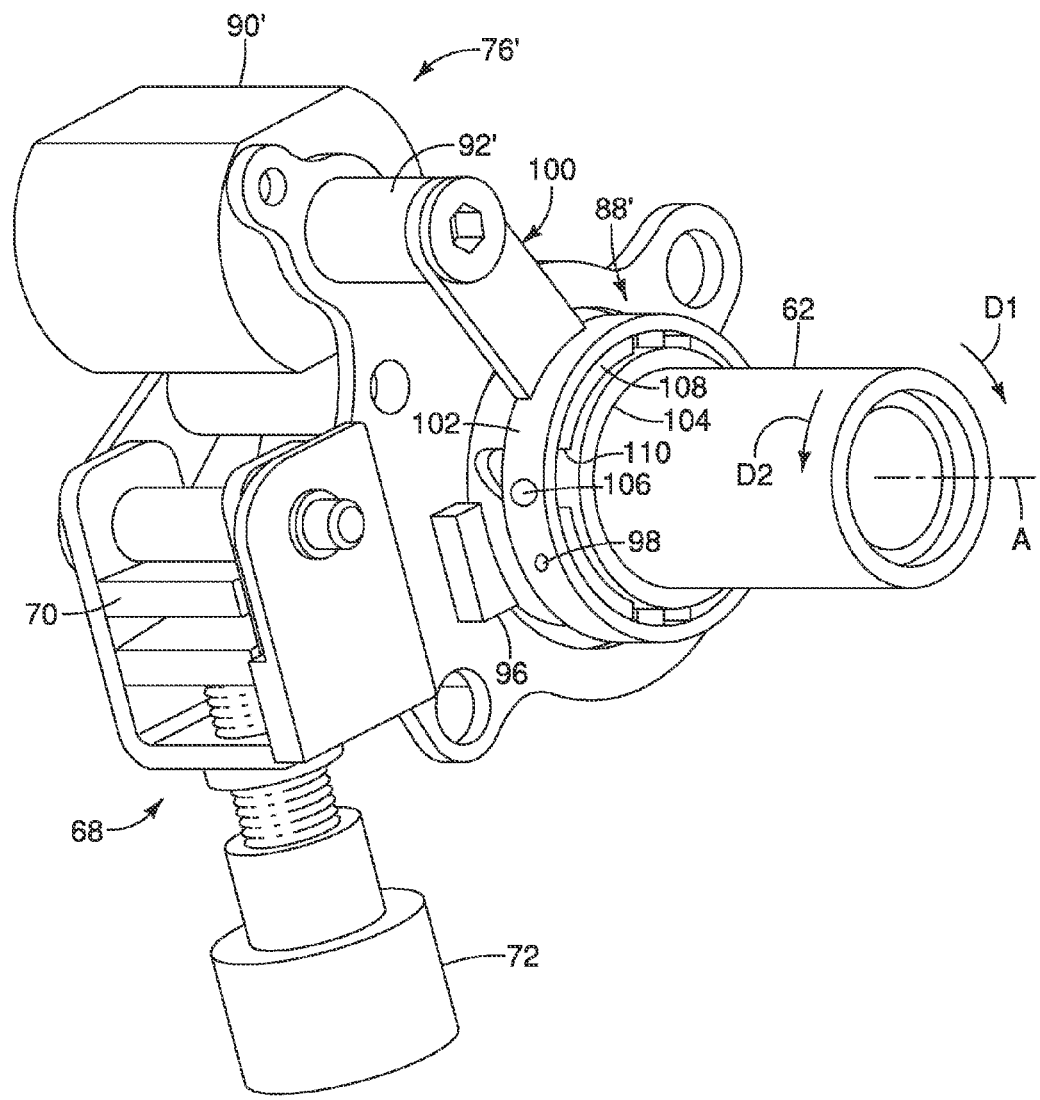
FIG. 17 is a frame facing side perspective view of the electric actuator with an alternative mode switching part fir switching the one-way clutch between the clutch-off mode and the clutch-on mode.
Figure 18:
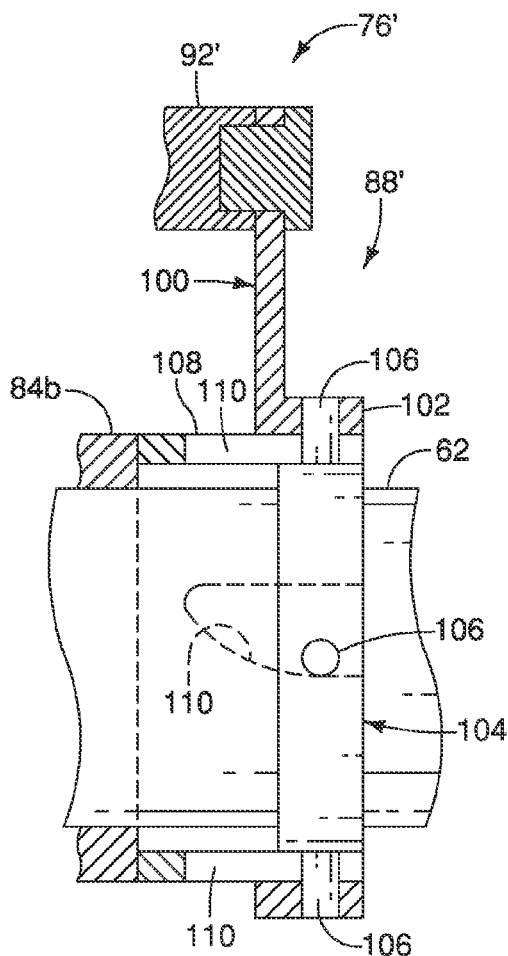
FIG. 18 is a simplified view of the electric actuator with the alternative mode switching part in which the one-way clutch is in the clutch-on mode.
Figure 19:
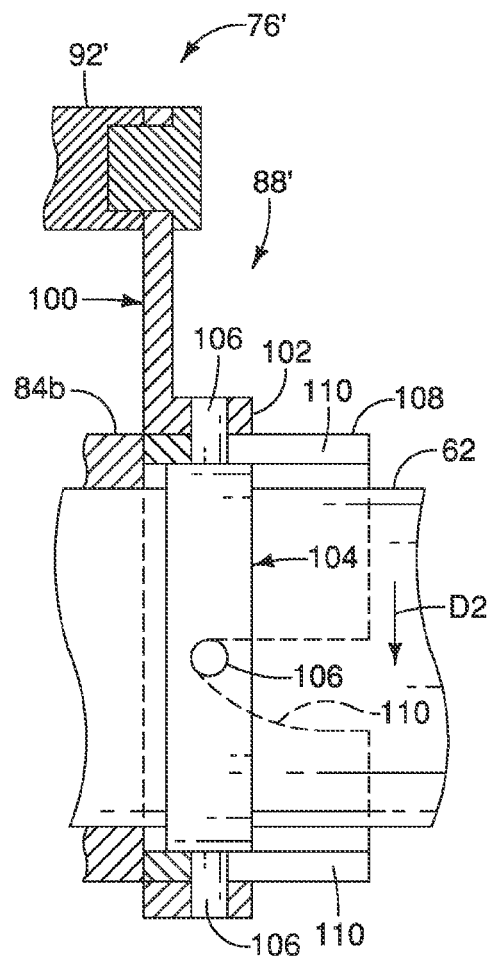
FIG. 19 is a simplified view of the electric actuator with the alternative mode switching part in which the one-way clutch is in the clutch-off mode.

In the embodiment of FIGS. 17 to 19, an alternative electric actuator 76' is illustrated replaces the electric actuator 76. Basically, the electric actuator 76' operates in a similar manner to the electric actuator 76, as discussed above, to switch the one-way clutch 74 between the clutch-on mode and the clutch-off mode. FIGS. 17 and 18 show the electric actuator 76' in a clutch-on position so that the one-way clutch 74 (see FIGS. 6, 8 and 9) is in the clutch-on mode. FIG. 19 shows the electric actuator 76' in a clutch-off position so that the one-way clutch 74 (see FIGS. 6, 8 and 9) is in the clutch-off mode. Here, the electric actuator 76' includes a mode switching part 88' and a solenoid 90'. The solenoid 90' is operatively coupled to the mode switching part 88 to switch the one-way clutch 74 between the clutch-on mode and the clutch-off mode. In particular, the electric actuator 76 further includes a holder 100 that is connected to the solenoid 90' to move in a direction parallel to the rotational axis A. Here, for example, the holder has an outer sleeve 102, an inner sleeve 104 and a plurality of connecting pins 106. The connecting pins 106 interconnect the outer sleeve 102 and the inner sleeve 104 together. The mode switching part 88' includes a control ring 108 that is rotated about the rotational axis A as the solenoid 90' moves the holder 100 in the direction parallel to the rotational axis A. Here, for example, the control ring 108 is rotatably disposed between the outer sleeve 102 and the inner sleeve 104. The control ring 108 is fixed to the second retainer ring 84b. The electric actuator 76 includes further a cam structure that is formed on at least one of the control ring 108 and the holder 102. Here, for example, the control ring 108 has a plurality of cam slots 110. The cam slots 110 constitutes cam structure that cooperates with the connecting pins 106 to rotate the control ring 108 as the holder 100 in the direction parallel to the rotational axis A. Basically, when the control ring 108 of the mode switching part 88' rotates from the clutch-on position as seen in FIGS. 17 and 18 to the clutch-off position as seen in FIG. 19, the second retainer ring 84b rotates in the second rotational direction D2. Thus, the rotation of the second retainer ring 84b locks the one-way dutch 74 in the clutch-off mode so that the rotational axle 62 can rotate freely without resistance from the friction element 70.

Figure 20:
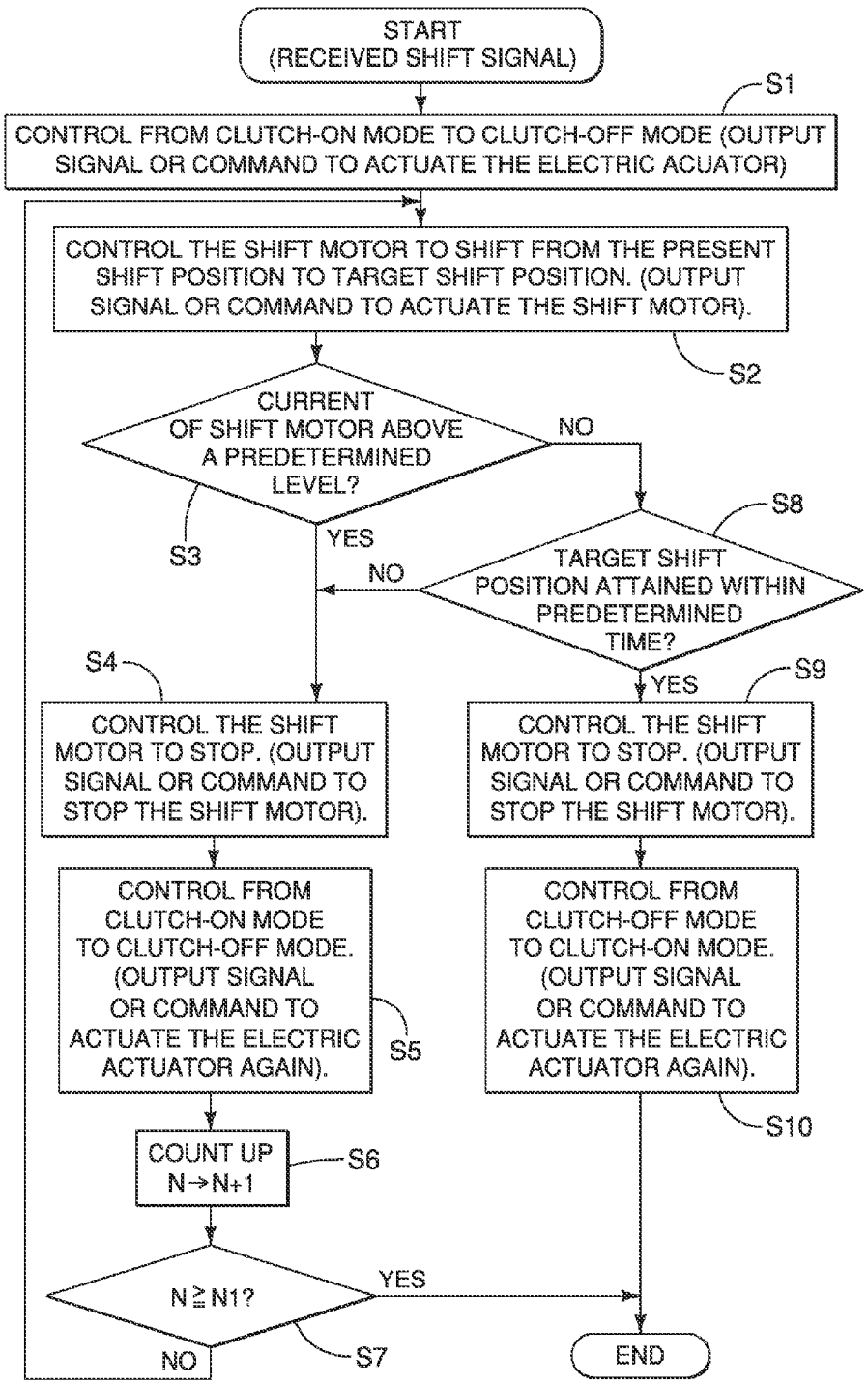
FIG. 20 is a first flowchart showing exemplary control operations executed by the controller of the rear derailleur.

Referring now to FIG. 20, a first control process will now be discussed, which is executed by the controller 54 for controlling the mode of the one-way clutch 74 for a down shifting operation (i.e., the chain 22 move to a larger one of the sprockets 20) of the rear derailleur 12. This control process is executed when the controller 54 receives a shift signal from either the bicycle control unit 24 or the electric shifter 28. As mentioned above, the shift signal can be generated by the bicycle control unit 24 based on one or more operating conditions of the bicycle 10 when set to an automatic shifting mode. Alternatively, the shift signal can be generated by the rider operating the electric shifter 28.

In this process of FIG. 20, the actuator position sensor 96 can be eliminated. Thus, the rear derailleur 12 can be more compact and less expensive than a derailleur having a position sensor for detecting the clutch-on position and the clutch-off position of the electric actuator 76.

In step S1, the controller 54 controls the electric actuator 76 to switch the one-way clutch 74 from the clutch-on mode (i.e., the one-way clutch 74 is operable) to the clutch-off mode (i.e., the one-way clutch 74 is inoperable). Then the process proceeds to step S2.

In step S2, the controller 54 activates the shift motor 52 to turn the output shaft 60 of the gear reduction unit 56 such that the outer and inner links 46 and 48 move the movable member 42 and the chain guide 44 laterally with respect to the base member 40. Thus, the rear derailleur 12 is moved from the present shift (gear) position to a target shift (gear) position.

Thus, as a result of the operations of steps S1 and S2, the controller 54 controls the electric actuator 76 from the clutch-on position to the clutch-off position as the chain guide 44 moves in a lateral direction with respect to the base member 40 from a first (present) gear position to a second (target) gear position. Then the process proceeds to step S3.

In step S3, the controller 54 determines if the current level of the shift motor 52 is above a predetermined current level. If the current level of the shift motor 52 is above a predetermined current level, then the controller 54 determines that the friction element 70 is still applying rotational resistance to the rotational axle 62. Thus, the one-way clutch 74 is determined to be still operable, and the process proceeds to step S4.

In step S4, the controller 54 stops the shift motor 52 and then the process proceeds to step S5, where the controller 54 again controls the electric actuator 76 to switch the one-way clutch 74 from the clutch-on mode to the clutch-off mode. Thus, as a result of the operations of steps S4 and S5, the controller 54 controls the electric actuator 76 to the clutch-on position while the chain guide 44 is not being shifted. Then the process proceeds to step S6.

In step S6, the controller 54 increases a present counter value "N" by one. In other words, the controller 54 includes a counter that counts the number of times the controller 54 has attempted to complete the shift to the target shift (gear) position before ending the process.

After step S6, the process proceeds to step S7, where the controller 54 compares the present counter value "N" with a predetermined counter value "N1". If the present counter value "N" is equal to or above the predetermined counter value "N1", then the process ends. However, if the present counter value "N" is below the predetermined counter value "N1", then the process proceeds back to step S2. In this way, the controller 54 repeatedly attempts to control the electric actuator 76 to the clutch-on upon detecting current of the electric actuator 76 being above the predetermined current level during a shifting operation. In other words, the counter of the controller 54 is used to determine how many times the process will repeatedly attempts to complete the shift to the target shift (gear) position before ending the process.

The controller 54 preferably has a factory setting for a predetermined counter value "N1" which corresponds to a maximum number of attempts to retry completing the shift to the target shift (gear) position before ending the process. Also preferably, this predetermined counter value "N1" can be adjusted by the rider or someone to a desired value using the bicycle control unit 24, a personal computer that plugs directly into the rear derailleur 12, an adjustment device provided on the rear derailleur 12, or any other desirable ways.

In step S3, if the controller 54 determines the level of the current of the shift motor 52 is equal to or below the predetermined current level, then the process proceeds to step S8 since the controller 54 has determined the one-way clutch 74 is in the clutch-off mode.

In step S8, the controller 54 determines if the target shift (gear) position has been attained within a predetermined amount of time using the shift stage position sensor 58. If no, then the controller 54 executes steps S4 to S7 as discussed above. As a result of the operations of steps S6, S7 and S8, the controller 54 repeatedly attempts to control the electric actuator 76 to the clutch-off position upon a predetermined time having elapsed without receiving a signal indicative of a next gear position being attained after a shift operation command has been issued.

However, in step S8, if the controller 54 determines that the target shift (gear) position has been attained within the predetermined amount of time, then the process proceeds to step S9.

In step S9, the controller 54 stops the shift motor 52 and then the process proceeds to step S10, where the controller 54 controls the electric actuator 76 to switch the one-way clutch 74 from the clutch-off mode to the clutch-on mode. Then the process ends.

Figure 21:
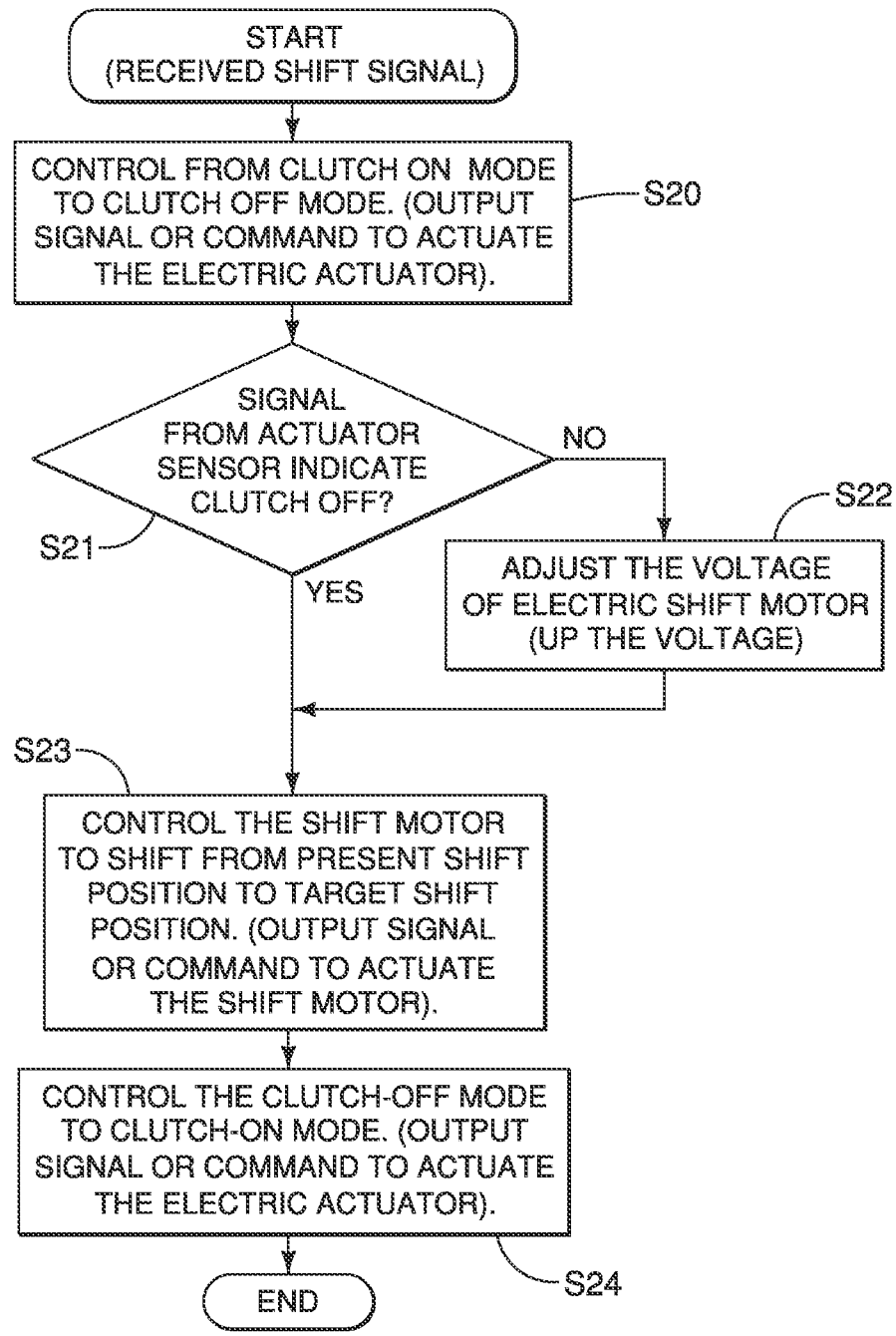
FIG. 21 is a second flowchart showing exemplary control operations executed by the controller of the rear derailleur.

Referring now to FIG. 21, a second or alternative control process will now be discussed, which is executed by the controller 54 for controlling the mode of the one-way clutch 74 for a down shifting operation (i.e., the chain 22 move to a larger one of the sprockets 20) of the rear derailleur 12. This control process is executed when the controller 54 receives a shift signal from either the bicycle control unit 24 or the electric shifter 28 as mentioned above.

In step S20, the controller 54 controls the electric actuator 76 to switch the one-way clutch 74 from the clutch-on mode to the clutch-off mode. Then the process proceeds to step S21.

In step S21, the controller 54 determines if the signal from the actuator position sensor 96 indicates that the one-way clutch 74 is in the clutch-off mode. If no, then the process proceeds to step S22, where the controller 54 adjusts the voltage output of the shift motor 52 to a higher level so that the shift motor 52 can complete the shifting operation with the increased force needed due to the friction element 70 applying rotational resistance to the rotational axle 62. In other words, the controller 54 adjusts increases) the voltage output to the shift motor 52, which is operatively coupled to the movable member 42 by the links 46 and 48, to move the movable member 42 in a lateral direction with respect to the base member 40 upon the actuator position sensor 96 indicating the operation position of the electric actuator 76 is in the clutch-on position, during a shifting operation. In this way, the shift can be reliably performed while the one-way clutch 74 is in the clutch-on mode such that the friction element 70 applies rotational resistance to the rotational axle 62. Then the process proceeds to step S23.

The process also proceeds to step S23, if the controller 54 determines the signal from the actuator position sensor 96 indicates that the one-way clutch 74 is in the clutch-off mode. In step S23, the controller 54 activates the shift motor 52 to turn the output shaft 60 of the gear reduction unit 56 such that the outer and inner links 46 and 48 move the movable member 42 and the chain guide 44 laterally with respect to the base member 40. Thus, the rear derailleur 12 is moved from the present shift (gear) position to a target shift (gear) position. Then the process proceeds to step S24.

In step S24, the controller 54 controls the electric actuator 76 to switch the one-way clutch 74 from the clutch-off mode to the clutch-on mode. Then the process ends.

Figure 22:
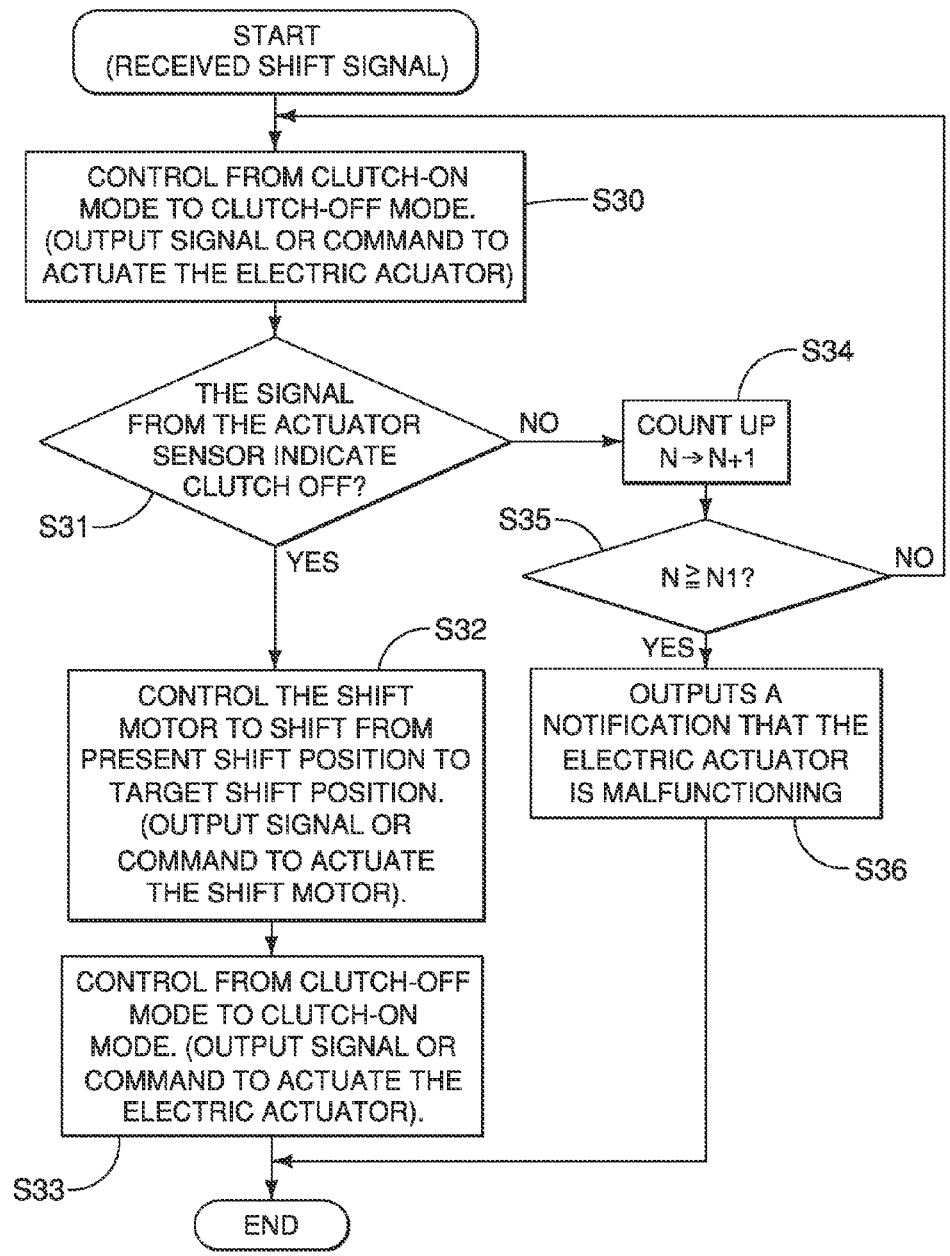
FIG. 22 is a third flowchart showing exemplary control operations executed by the controller of the rear derailleur.

Referring now to FIG. 22, a third or alternative control process will now be discussed, which is executed by the controller 54 for controlling the mode of the one-way clutch 74 for a down shifting operation (i.e., the chain 22 move to a larger one of the sprockets 20) of the rear derailleur 12. This control process is executed when the controller 54 receives a shift signal from either the bicycle control unit 24 or the electric shifter 28 as mentioned above.

In step S30, the controller 54 controls the electric actuator 76 to switch the one-way clutch 74 from the clutch-on mode to the clutch-off mode. Then the process proceeds to step S31

In step S31, the controller 54 determines if the signal from the actuator position sensor 96 indicates that the one-way clutch 74 is in the clutch-off mode. If yes, then process proceeds to step S32.

In step S32, the controller 54 activates the shift motor 52 to turn the output shaft 60 of the gear reduction unit 56 such that the outer and inner links 46 and 48 move the movable member 42 and the chain guide 44 laterally with respect to the base member 40. Thus, the rear derailleur 12 is moved from the present shift (gear) position to a target shift (gear) position. Then the process proceeds to step S33.

In step S33, the controller 54 controls the electric actuator 76 to switch the one-way clutch 74 from the clutch-off mode to the clutch-on mode. Then the process ends.

However, in step S31, if the signal from the actuator position sensor 96 indicates that the one-way clutch 74 is still in the clutch-on mode, then the process proceeds to step S34, where the controller 54 increases a present counter value "N" by one. Then the process proceeds to step S35, where the controller 54 compares the present counter value "N" with a predetermined counter value "N1". If the present counter value "N" is equal to or above the predetermined counter value "N1", then the process proceeds to step S36, where the controller 54 outputs a notification that the electric actuator 76 is malfunctioning. Then the process ends.

Thus, in this process of FIG. 22, the controller 54 outputs a notification that the electric actuator 76 is malfunctioning upon reaching a predetermined number of attempts. The notification that the electric actuator 76 is malfunctioning can be displayed on the display of the bicycle control unit 24 (see FIG. 2). Preferably, each time the electric actuator 76 malfunctions, the data on the malfunction is stored in memory of the controller 54 and/or the bicycle control unit 24. The data on the malfunction of the electric actuator 76 can then be subsequently read by the external computer (PC) via a wire or wirelessly.

On the other hand, in step S35, if the counter "N" is below the predetermined counter value "N1", then the process proceeds back to step S30. Thus, the controller 54 repeatedly attempts to control the electric actuator 76 from the clutch-on position to the clutch-off position while the actuator position sensor 96 indicates the operation position of the electric actuator 76 is in the clutch-on position. Also a result of the operations of steps S30, S31, 34 and S35, the controller 54 operated the electric actuator 76 from the clutch-on position to the clutch-off position upon the actuator position sensor 96 indicating the operation position of the electric actuator 76 is in the clutch-on position after a shift operation command has been issued.

Figure 23:
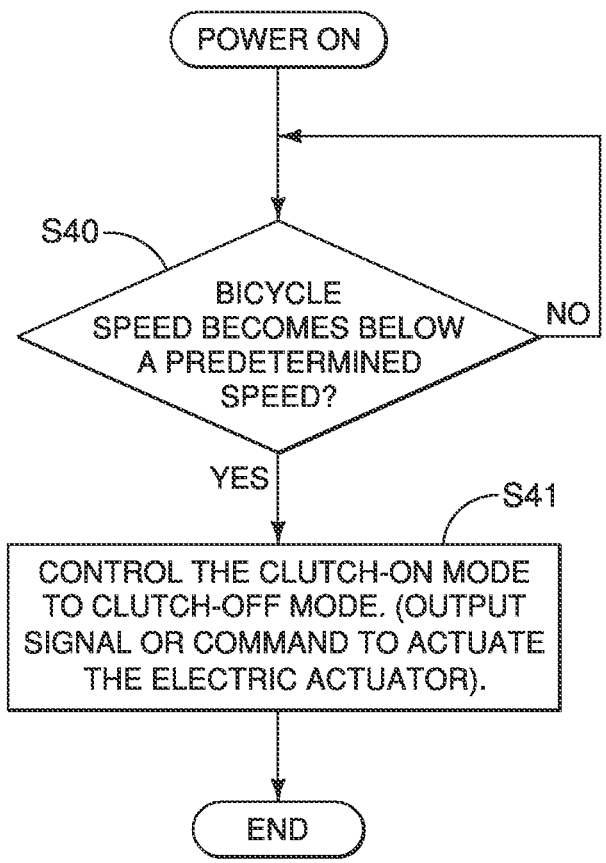
FIG. 23 is a fourth flowchart showing exemplary control operations executed by the controller of the rear derailleur.

Referring now to FIG. 23, a fourth or alternative control process will now be discussed, which is executed by the controller 54 for controlling the mode of the one-way clutch 74 based on the vehicle speed. This control process is continuously executed upon power being supplied to the rear derailleur 12.

In step S40, the controller 54 determines if the bicycle speed of the bicycle is below a predetermined speed using the speed sensor 32. If no, then the process continues to repeat step S40.

If the controller 54 determines the bicycle speed of the bicycle is below the predetermined speed, then the process proceeds to step S23, where the controller 54 controls the electric actuator 76 to switch the one-way clutch 74 from the clutch-on mode to the clutch-off mode. Then the process ends.

In this process of FIG. 23, when bicycle speed become below predetermined speed, the frictional resistance on the rotational axle 62 is not need on the high rotational load of P axle because the chain guide 44 is not likely to rotate and create undesirable slack in the chain 22. Thus, the controller 54 controls the electric actuator 76 from the clutch-on position to the clutch-off position upon determining a bicycle speed is below a predetermined speed. By switching the one-way clutch 74 to the clutch-off mode at low speeds, less power can be consumed during shifting at low speeds.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

Also as used herein to describe the rear derailleur 12, the following directional terms "forward", "rearward", "above", "downward" ", vertical", "horizontal", "below" "lateral" and "transverse" as well as any other similar directional terms refer to directions with respect to an upright bicycle equipped with the rear derailleur 12 on a level surface. Accordingly, these terms, as utilized to describe the rear derailleur 12 should be interpreted relative to an upright bicycle that is equipped with the rear derailleur 12 in an installed position on a level surface.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention.

The term "coupled" or "coupling", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "attached", "mounted", "bonded", "fixed" and their derivatives.

Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A rear derailleur comprising:
   a base member configured to be mounted to a bicycle;
   a movable member movably coupled to the base member;
   a chain guide coupled to the movable member to rotate around a rotational axis with respect to the movable member;
   a friction element operatively arranged between the movable member and the chain guide to frictionally provide rotational resistance in a first rotational direction of the chain guide;
   a one-way clutch operatively disposed between movable member and the chain guide to engage the friction element as the chain guide rotates in the first rotational direction; and
   an electric actuator operatively coupled to the one-way clutch to control the one-way clutch between a clutch-on mode and a clutch-off mode.

2. The rear derailleur according to claim 1, wherein the electric actuator is mounted on the movable member.

3. The rear derailleur according to claim 1, wherein the electric actuator includes a motor having an output shaft, and a mode switching part being operatively coupled to the output shaft of the motor to switch the one-way clutch between the clutch-on mode and the clutch-off mode.

4. The rear derailleur according to claim 3, wherein the electric actuator further includes a gear reduction unit connecting the output shaft of the motor to the mode switching part.

5. The rear derailleur according to claim 1, wherein the electric actuator includes a mode switching part and a solenoid, which is operatively coupled to the mode switching part to switch the one-way clutch between the clutch-on mode and the clutch-off mode.

6. The rear derailleur according to claim 5, wherein the electric actuator includes a holder connected to the solenoid to move in a direction parallel to the rotational axis, and
   the mode switching part of the one-way clutch includes a control ring that rotates about the rotational axis as the solenoid moves the holder in the direction parallel to the rotational axis.

7. The rear derailleur according to claim 6, wherein the electric actuator includes further a cam structure formed on at least one of the control ring and the holder.

8. The rear derailleur according to claim 1, wherein the first rotational direction is a counterclockwise rotational direction of the chain guide around the rotational axis while being viewed along the rotational axis from a non-frame facing side of the movable member.

9. The rear derailleur according to claim 1, further comprising
   a biasing element biasing the movable member toward a low gear position with respect to the base member.

10. The rear derailleur according to claim 1, further comprising
    a shift motor operatively coupled to the movable member to move the movable member in a lateral direction with respect to the base member.

11. The rear derailleur according to claim 1, further comprising
    a controller connected to the electric actuator to control the electric actuator between a clutch-on position, which controls the one-way clutch to the clutch-on mode, and a clutch-off position, which controls the one-way clutch to the clutch-off mode.

12. The rear derailleur according to claim 11, wherein the controller controls the electric actuator from the clutch-on position to the clutch-off position as the chain guide moves in a lateral direction with respect to the base member from a first gear position to a second gear position.

13. The rear derailleur according to claim 11, wherein the controller controls the electric actuator to the clutch-on position while the chain guide is not being shifted.

14. The rear derailleur according to claim 11, wherein the controller repeatedly attempts to control the electric actuator to the clutch-off position upon a predetermined time having elapsed without receiving a signal indicative of a next gear position being attained after a shift operation command has been issued.

15. The rear derailleur according to claim 11, wherein the controller repeatedly attempts to control the electric actuator to the clutch-on upon detecting current of the electric actuator being above a predetermined current level during a shifting operation.

16. The rear derailleur according to claim 11, further comprising
    an actuator position sensor arranged to detect an operation position of the electric actuator,
    the controller adjusting a voltage output to a shift motor that operatively coupled to the movable member to move the movable member in a lateral direction with respect to the base member upon the actuator position sensor indicating the operation position of the electric actuator is in the clutch-on position, during a shifting operation.

17. The rear derailleur according to claim 11, further comprising
    an actuator position sensor arranged to detect an operation position of the electric actuator,
    the controller operating the electric actuator from the clutch-on position to the clutch-off position upon the actuator position sensor indicating the operation position of the electric actuator is in the clutch-on position after a shift operation command has been issued.

18. The rear derailleur according to claim 17, wherein the controller repeatedly attempts to control the electric actuator from the clutch-on position to the clutch-off position while the actuator position sensor indicates the operation position of the electric actuator is in the clutch-on position.

19. The rear derailleur according to claim 18, wherein the controller outputs a notification that the electric actuator is malfunctioning upon reaching a predetermined number of attempts.

20. The rear derailleur according to claim 11, wherein the controller controls the electric actuator from the clutch-on position to the clutch-off position upon determining a bicycle speed is below a predetermined speed.

* * * * *